Jan. 27, 1953 W. E. BURRELL 2,626,680
LUBRICATOR FOR WHEEL FLANGES
Filed April 27, 1951 3 Sheets-Sheet 1

INVENTOR
WILLIAM E. BURRELL
BY
ATTORNEY

Jan. 27, 1953 W. E. BURRELL 2,626,680
LUBRICATOR FOR WHEEL FLANGES
Filed April 27, 1951 3 Sheets-Sheet 2
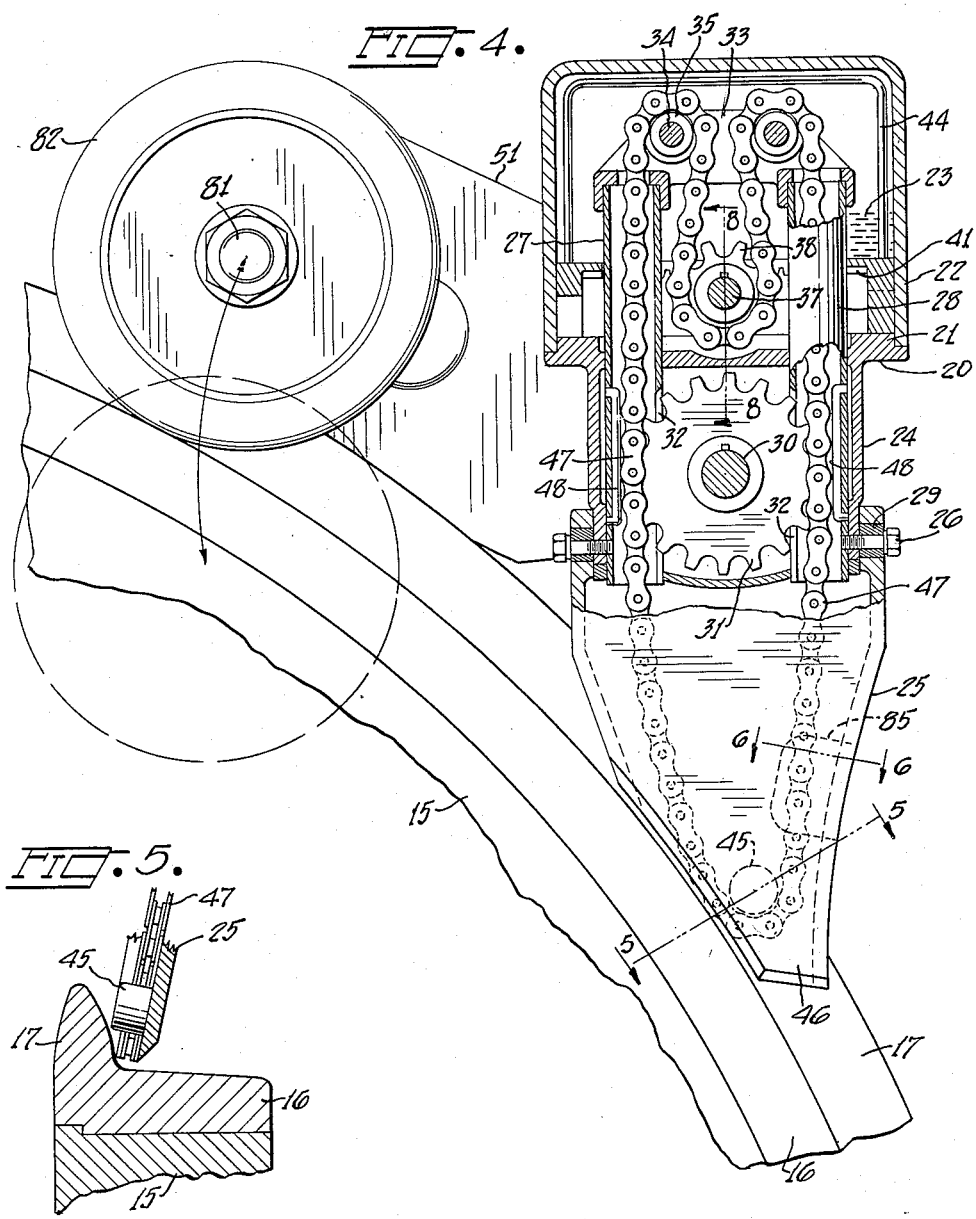
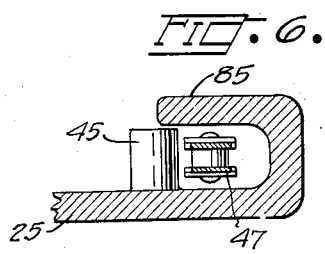
INVENTOR
WILLIAM E. BURRELL
BY E. B. Birkenbeul
ATTORNEY Jan. 27, 1953 W. E. BURRELL 2,626,680
LUBRICATOR FOR WHEEL FLANGES
Filed April 27, 1951 3 Sheets-Sheet 3
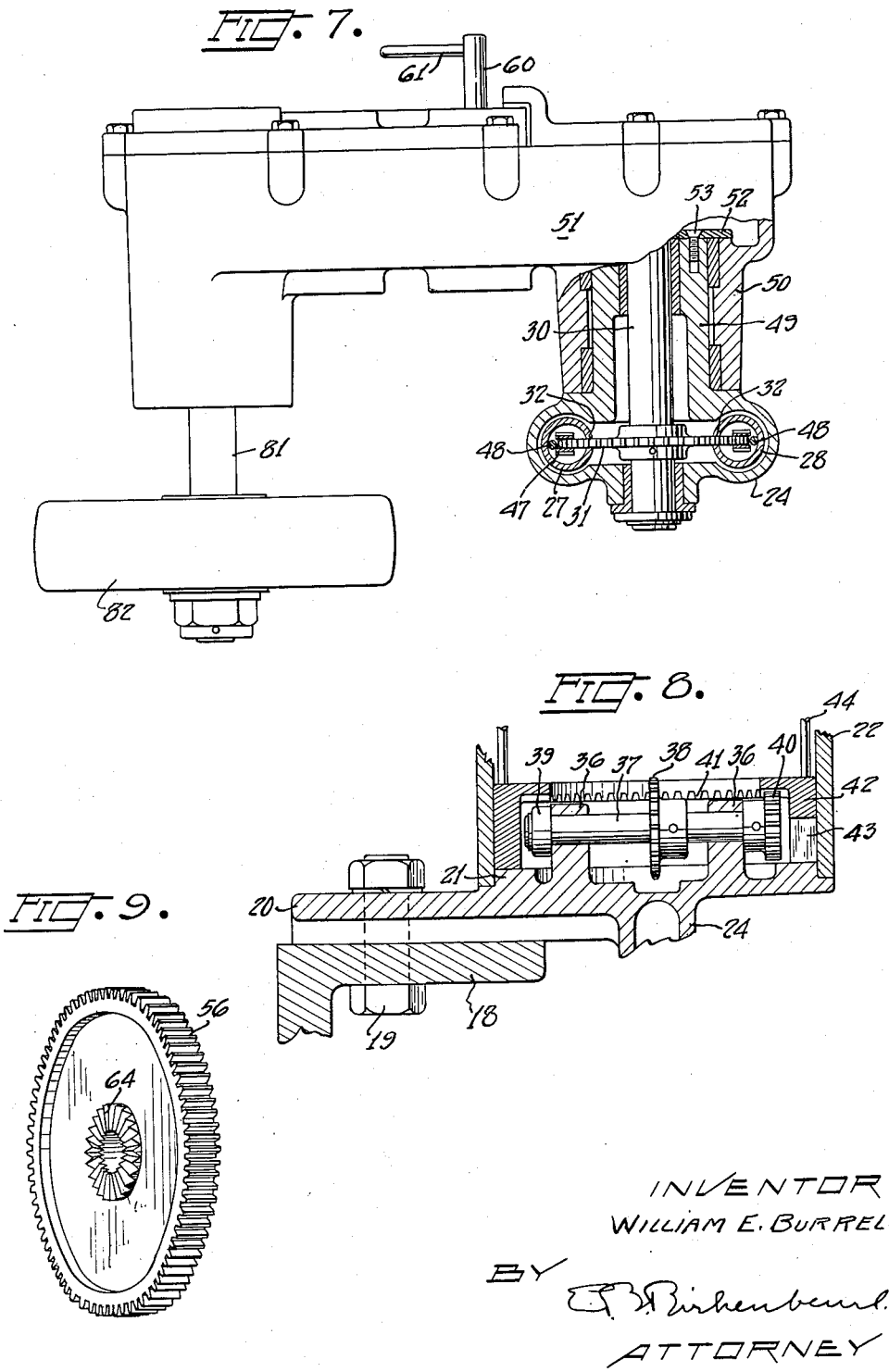
INVENTOR
WILLIAM E. BURRELL
BY
ATTORNEY Patented Jan. 27, 1953

2,626,680

UNITED STATES PATENT OFFICE 2,626,680

LUBRICATOR FOR WHEEL FLANGES

William E. Burrell, Portland, Oreg.

Application April 27, 1951, Serial No. 223,313

5 Claims. (Cl. 184—3)

1

This invention relates generally to track operated vehicles and particularly to a lubricator for wheel flanges.

The main object of this invention is to provide a better form of applicator for lubricant to the flanges of locomotive drive wheels.

The second object is to provide an improved form of drive mechanism for the device.

The third object is to apply measured quantities of lubricant.

These and other objects are accomplished in the manner set forth in the following specifications as illustrated in the accompanying drawings, in which Fig. 1 is a perspective view of the device with parts broken away and in section.

Fig. 4 is a section taken along the line 4—4 in Fig. 1, showing two positions of the friction wheel showing adaptability to a variety of mountings.

Fig. 5 is a section taken along the line 5—5 in Fig. 4.

Fig. 6 is a section taken along the line 6—6 in Fig. 4.

Fig. 7 is a plan view of the device with parts broken away in section.

Fig. 8 is a fragmentary section taken along the line 8—8 in Fig. 4 and showing a part of the locomotive frame to which the device is attached.

Fig. 9 is a perspective detail of the clutch gear shown in Figs. 1 and 2.

Like numbers of reference refer to the same or similar parts throughout the several views.

Figure 1:
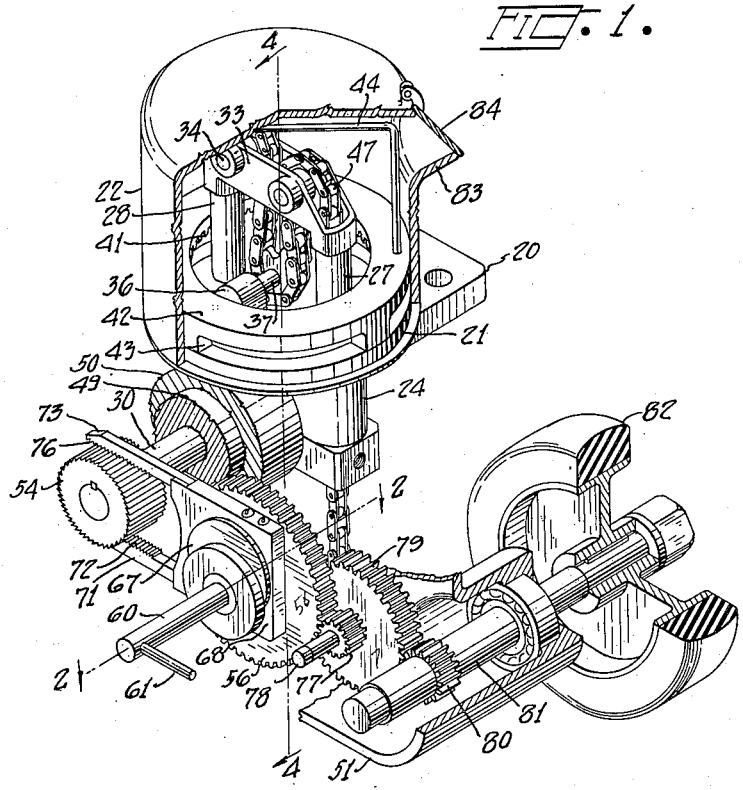
Figures 2, 3:
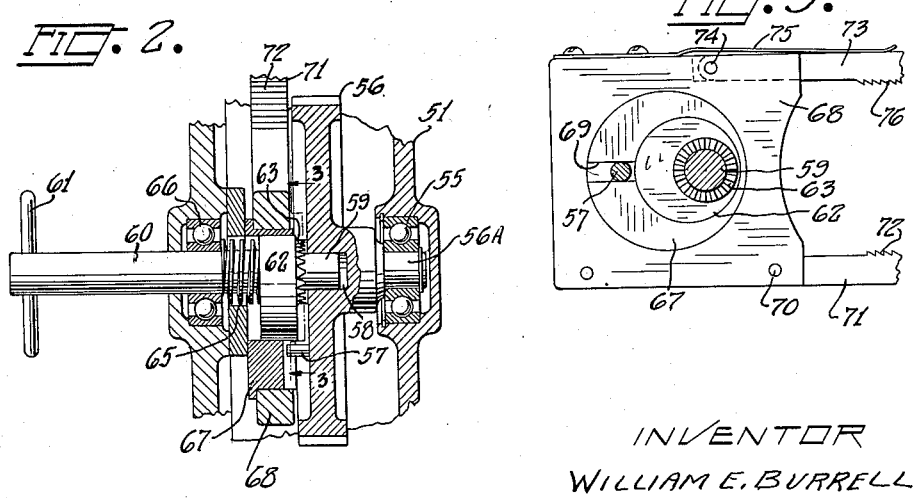
Fig. 2 is a fragmentary horizontal section taken along the line 2—2 in Fig. 1.
Fig. 3 is a vertical section along the line 3—3 in Fig. 2.

Referring in detail to the drawings there is shown a portion of a driving wheel 15 of a locomotive as well as its rim 16 and flange 17. There is also indicated a portion 18 of the locomotive frame to which the device is attached.

On the frame portion 18 is secured by means of a bolt 19 a horizontal base 20 having a circular boss 21 on its upper side, upon which is fitted a cylindrical reservoir 22 for lubricant 23.

Depending from the base 20 is a housing 24, to the lower end of which is hinged a shoe 25 by means of the bolts 26.

Mounted in the base 20 are the parallel chain tubes 27 and 28, the lower ends of which are held by the bolts 26. The shoe 25 contains the bushings 29 which journal on the bolts 26.

Transversely across the housing 24 is a shaft 30 on which is keyed a driving sprocket wheel 31 which extends through slots 32 in the tubes 27

2 and 28. Across the upper ends of the tubes 27 and 28 is a yoke 33 which supports a pair of shafts 34 on which are mounted the grooved rolls 35.

On the boss 21 are the standards 36 in which journals the short shaft 37 having a loading sprocket wheel 38 which is in alignment with wheel 31. On one end is a collar 39 and at the other end a pinion 40 which meshes with a ring gear 41 formed on the ring 42 having slots 43 formed in its under side. Mounted on the ring 42 is a wire bail 44, the purpose of which is to cut the lubricant free from the side of the reservoir 22. The bar 44 is U-shaped, the sides of which extend into the ring 42 and the middle portion of which extends diametrically across the ring 42 and it serves merely as an agitator. A stud 45 is mounted on the side of the shoe 25 near the end 46. The stud 45 rotates on an axis parallel to the axis of the shaft 30.

An endless block link chain 47 passes around the stud 45 and up through the tubes 27 and 28 in which it meshes with the wheel 31, thence over the rolls 35 and then around the sprocket 38. Guide tracks 48 in the lower ends of the tubes 27 and 28 hold the chain away from the tubes and into mesh with the sprocket wheel 31.

Extending laterally from the housing 24 is a hub 49 which forms a journal for the shaft 30. A sleeve 50, which projects from the swing housing 51, journals on the hub 49. The sleeve 50 is retained by the ring 52 and screws 53. On the shaft 30 is secured the wide faced ratchet wheel 54.

Journalling in the bearing 55 is the shaft end 56-A of a gear 56 from one side of which projects the pin 57. Slidably and rotatably extending into the hole 58 in the gear 56 is the end 59 of the eccentric shaft 60 having a T handle 61 at its outer end. Near the inner end of and integral with the shaft 60 is an eccentric 62 on one end of which are the clutch teeth 63 which normally mesh with clutch teeth 64 on the gear 56 under the urging of the spring 65. The shaft 60 is further supported by the anti-friction bearing 66. A second eccentric 67 is placed on the eccentric 62 and journals in the plate 68. The eccentric 67 has a radial slot 69 into which projects the pin 57.

The plate 68 has rigidly secured thereto, by means of the rivets 70, a finger 71 having teeth 72 which engage the teeth in the ratchet wheel 54.

On the plate 68 is a finger 73 which is hinged on the pin 74 and urged by a spring 75 to bring its teeth 76 into engagement with the teeth in the ratchet wheel 54. The purpose of this structure is merely to convert a variable eccentric motion into a rotary driving motion; that is, as the position of the eccentric 67 is determined by the turning of the handle 61, so is the stroke of the eccentric determined and, therefore, the amount of rotary motion imparted to the wheel 54. An intermediate pinion 77 on the shaft 78 meshes with the gear 560. An intermediate gear 79 on the shaft 78 meshes with the pinion 80 on the main drive shaft 81 which journals in the swing housing 51 and carries on its end a rubber tired wheel 82 which engages the track engaging portion of the wheel rim 16 and frictionally drives the mechanism.

It can be seen from the foregoing that, as the device is operated, lubricant is carried by the chain 47 to the flange 17 where the lubricant is deposited.

The delivery of lubricant can be controlled in a very satisfactory manner by means of the handle 61.

A filler spout 83 and hinged cover 84 are provided for the reservoir 22. An inturned lug 85 is formed on the foot 25 to hold the chain 47 on the stud 45.

I claim:

1. A flange lubricator comprising a reservoir, a pair of parallel tubes projecting through and above and below the bottom of said reservoir, a driving sprocket wheel mounted under said reservoir extending into said tubes, a loading sprocket wheel in said reservoir between said tubes, rollers above said tubes between said loading sprocket and adjacent tube, a shoe depending from said reservoir having a stud at its lower end, an endless block chain passing around said stud, through said tubes in mesh with said driving sprocket, thence over said rollers and around said loading sprocket wheel, means for driving said chain and means for varying the speed of said chain with relation to the rim speed of the wheel on which it is used.

2. In a flange lubricator the combination of a reservoir for lubricant, an endless chain extending into said reservoir, one end of said chain dragging against a wheel flange, a sprocket wheel for driving said chain, a shaft driving said sprocket wheel, a ratchet wheel keyed on said shaft, a swing housing hinged on said ratchet shaft, an adjustable eccentric mounted in said housing, means for varying the stroke of said eccentric, pawls actuated by said eccentric engaging said ratchet wheel, a rubber tired wheel on the swinging end of said housing and gearing between the rubber tired wheel and said eccentric whereby the rotation of said rubber covered wheel will drive said eccentric and drive said chain.

3. A lubricator for locomotive wheel flanges comprising a reservoir adapted to be secured to a locomotive frame, a swing housing hinged to said reservoir, an endless chain having a portion thereof extending into said reservoir and another portion engaging the locomotive wheel flange, a rubber tired wheel mounted at the swinging end of said housing, and a gear drive in said housing between said wheel and chain.

4. The lubricator as described in claim 3, together with a bail revolvably mounted in said reservoir for maintaining the lubricant in a mixed condition and for preventing tunneling through the lubricant by said chain.

5. In a lubricator of the class described, the combination of a base mountable on a locomotive frame, a reservoir mounted on said base, a pendant shoe hinged to said base, said shoe having a laterally projecting stud at its lower end, normal to the hinge axis of said shoe, a pair of vertical tubes extending through the bottom of said reservoir, an endless chain passing around said stud and upwardly through said tubes and then bending downwardly into the lubricant in said reservoir, a drive sprocket wheel extending into said tubes and engaging said chain, and a variable speed drive for said sprocket wheel frictionally driven from the locomotive wheel.

WILLIAM E. BURRELL.

REFERENCES CITED

The following references are of record in the file of this patent:

UNITED STATES PATENTS

| Number | Name | Date |
|---|---|---|
| 837,774 | Baird | Dec. 4, 1906 |
| 2,441,685 | Burrell | May 18, 1948 |